United States Patent
Shibagaki

(10) Patent No.: US 6,443,120 B2
(45) Date of Patent: Sep. 3, 2002

(54) CONTROLLING APPARATUS AND METHOD OF INTERNAL COMBUSTION ENGINE

(75) Inventor: Nobuyuki Shibagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/838,843

(22) Filed: Apr. 20, 2001

(30) Foreign Application Priority Data

Apr. 21, 2000 (JP) ........................................ 2000-120700

(51) Int. Cl.$^7$ ............................................... F02M 25/07
(52) U.S. Cl. ..................................... 123/295; 123/568.21
(58) Field of Search ............................ 123/295, 568.21, 123/305

(56) References Cited

U.S. PATENT DOCUMENTS

| | | | | |
|---|---|---|---|---|
| 4,066,046 A | * | 1/1978 | McAlister | 123/295 |
| 4,480,620 A | * | 11/1984 | Tange et al. | 123/295 |
| 5,979,396 A | * | 11/1999 | Yasuoka | 123/295 |
| 5,996,547 A | * | 12/1999 | Machida et al. | 123/295 |
| 6,116,210 A | * | 9/2000 | Oder | 123/295 |
| 6,142,117 A | * | 11/2000 | Hori et al. | 123/295 |
| 6,145,489 A | * | 11/2000 | Kazama et al. | 123/295 |
| 6,167,863 B1 | * | 1/2001 | Kazama et al. | 123/568.21 |
| 6,298,835 B1 | * | 10/2001 | Hori et al. | 123/568.21 |
| 6,305,347 B1 | * | 10/2001 | Russell | 123/295 |

FOREIGN PATENT DOCUMENTS

| | | |
|---|---|---|
| JP | 9-032651 | 2/1997 |
| JP | 11-036920 | 2/1999 |
| JP | 11-036926 | 2/1999 |
| JP | 11-287143 | 10/1999 |

* cited by examiner

*Primary Examiner*—Paul J. Hirsch
(74) *Attorney, Agent, or Firm*—Kenyon & Kenyon

(57) ABSTRACT

A target homogeneous mode throttle opening TA1 that is suitable for homogeneous stoichiometric combustion without EGR is computed regardless of the current combustion mode. During homogeneous stoichiometric combustion without EGR, the opening of a throttle valve is controlled based on the target opening TA1. During homogeneous stoichiometric combustion with EGR, an opening adjustment value TAo is added to the target opening TA1 and the resultant is set as a target EGR throttle opening TA2. The opening of the throttle valve is controlled based on the target opening TA2. During stratified lean combustion, the fuel injection amount is controlled based on a hypothetical throttle opening TA1, which corresponds to the target opening TA1. In either combustion mode, the engine torque is adjusted based on a common control value, which is the target opening TA1. Therefore, the engine torque is not abruptly changed when the combustion mode is switched.

14 Claims, 5 Drawing Sheets

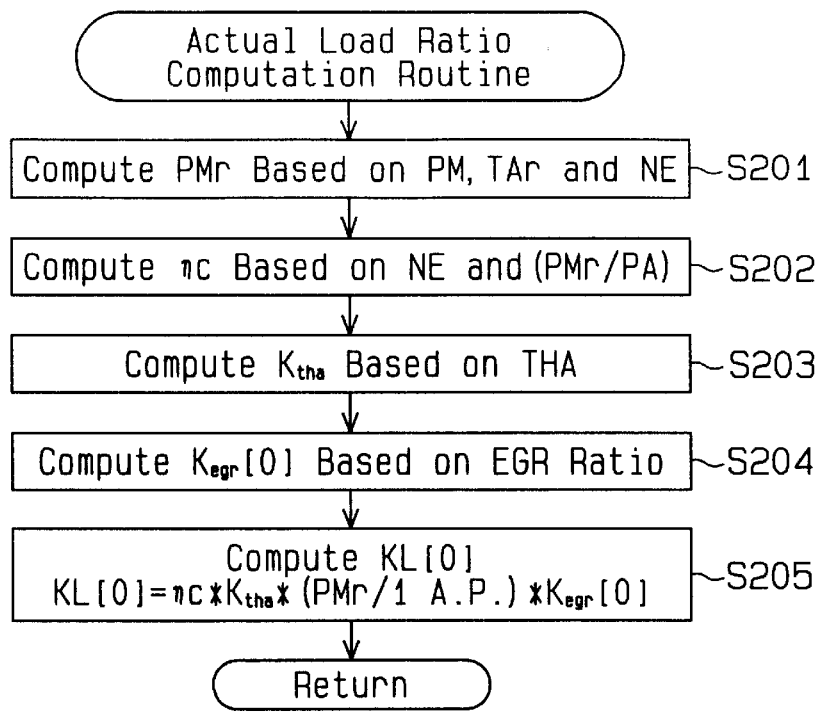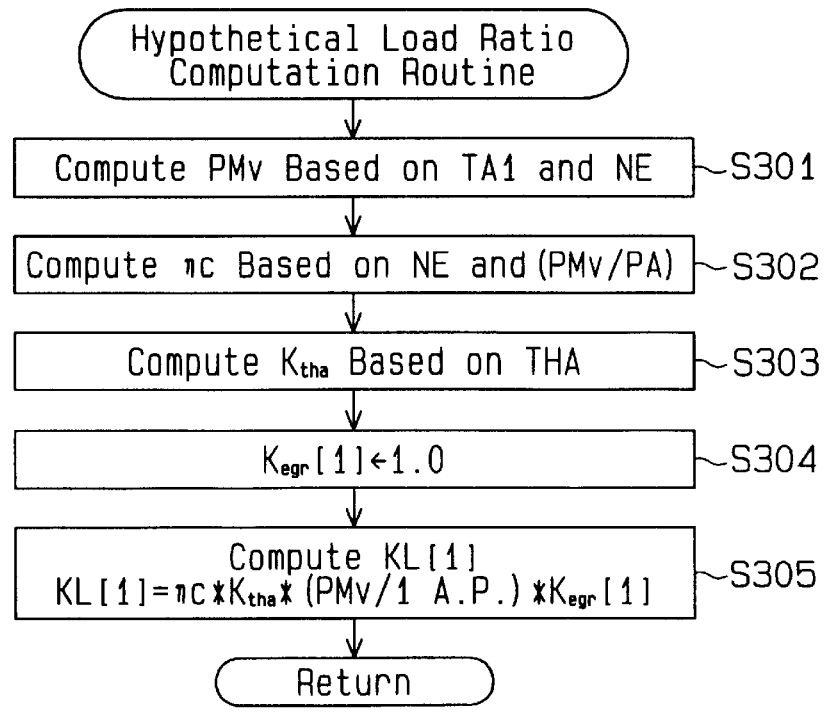

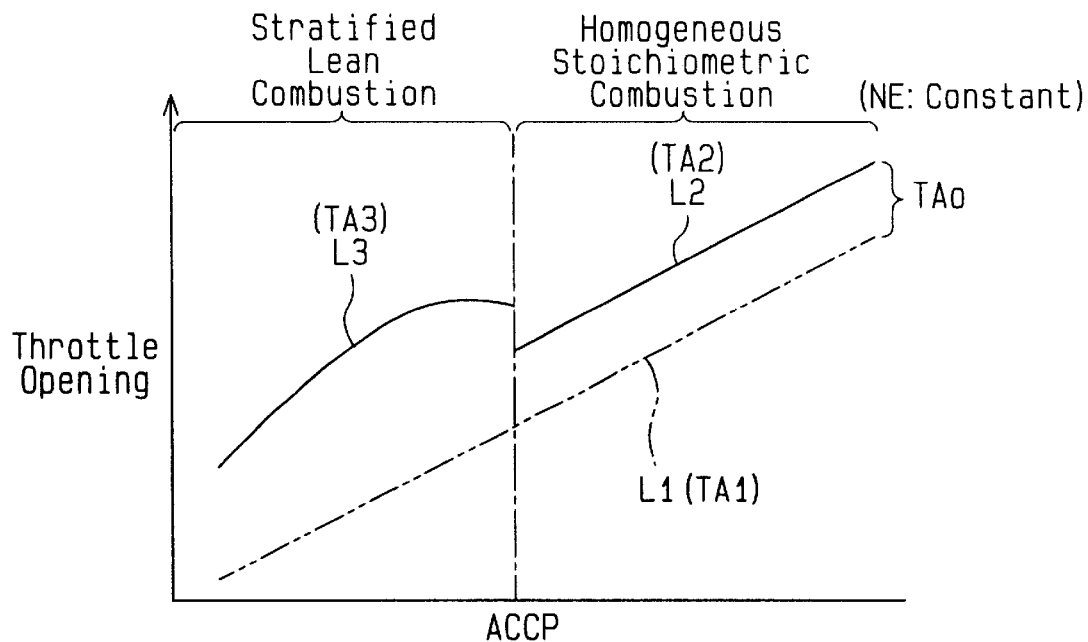
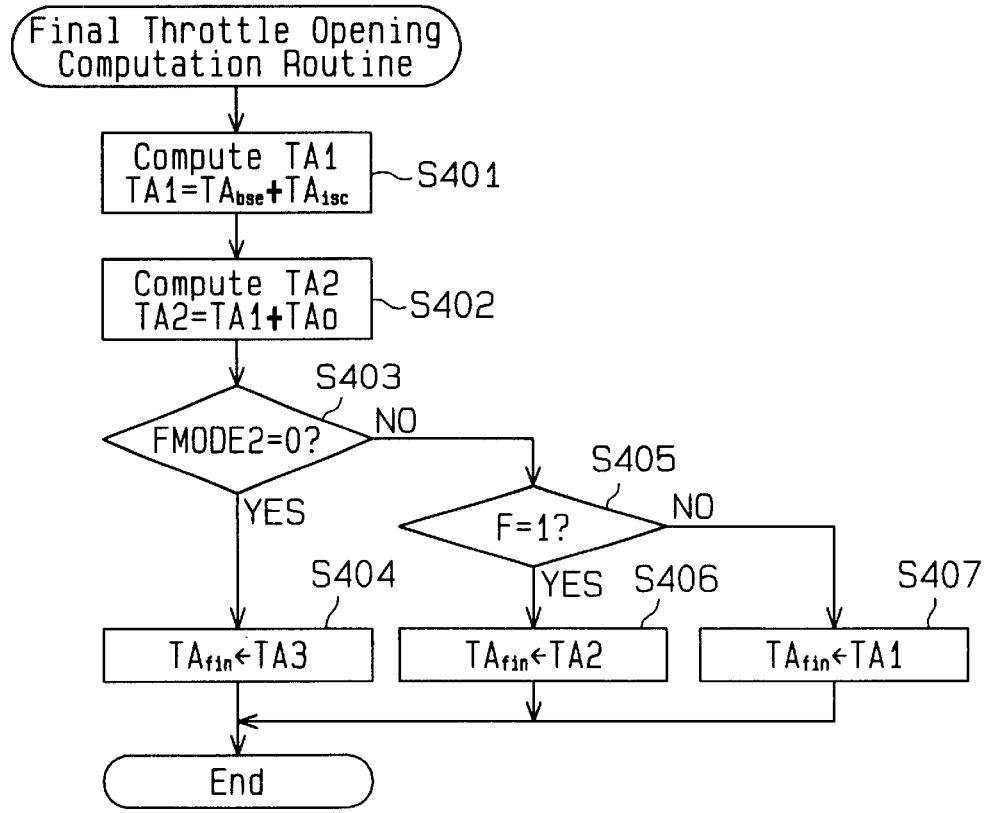

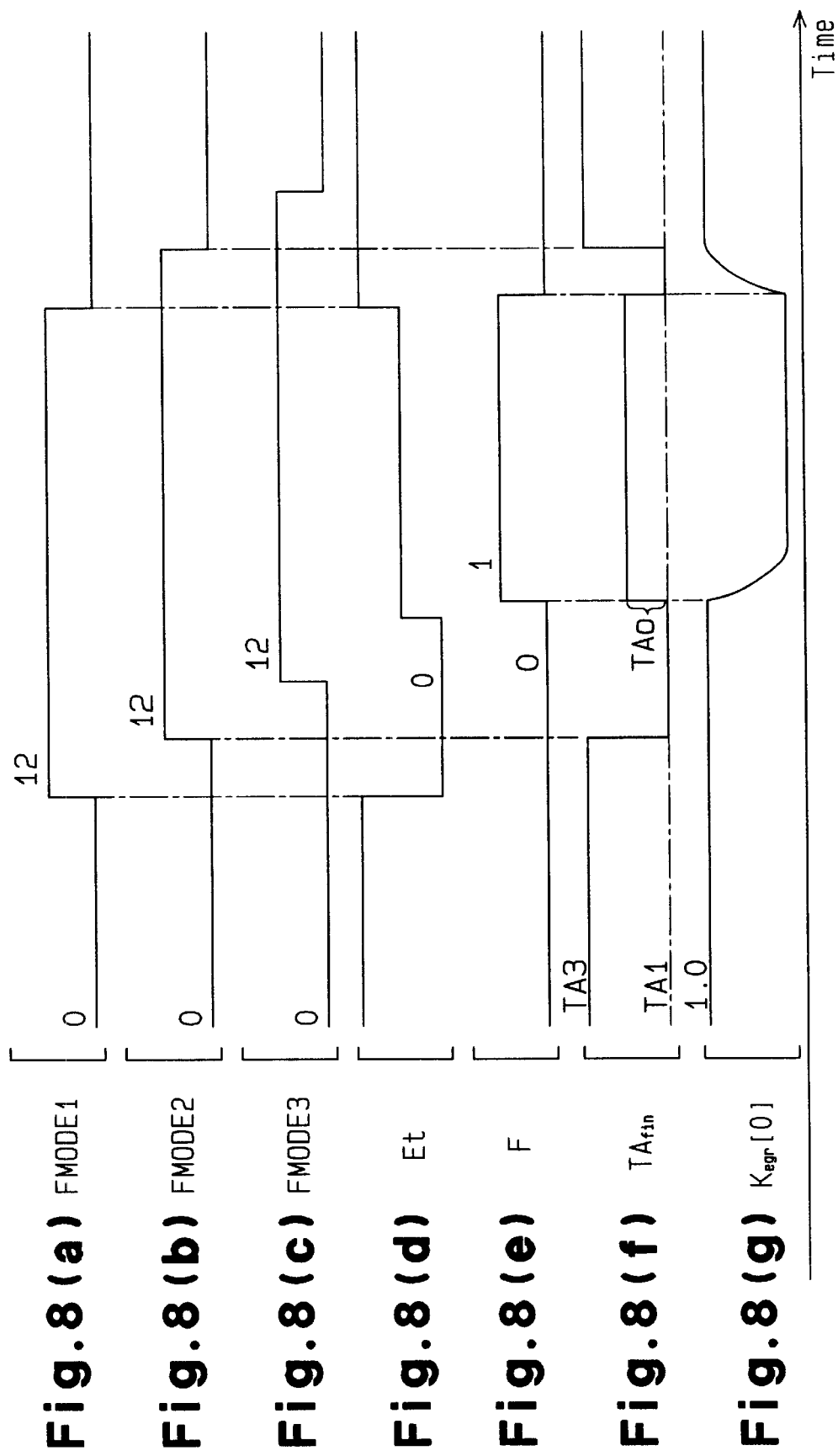

CONTROLLING APPARATUS AND METHOD OF INTERNAL COMBUSTION ENGINE

BACKGROUND OF THE INVENTION

The present invention relates to a controlling apparatus and a method of an internal combustion engine.

To improve fuel economy and to increase engine power at the same time, engines that change combustion mode between stratified lean combustion and homogeneous stoichiometric combustion according to current running conditions have been introduced. Such engines perform exhaust gas recirculation (EGR). Specifically, the engine recirculates exhaust to an intake system during stratified lean combustion to reduce the exhausted amount of nitrogen oxide and to improve fuel economy. Japanese Unexamined Patent Publication 9-32651 discloses an engine that performs EGR during homogeneous stoichiometric combustion in accordance with the running state to reduce the exhaust of NOx and to improve the fuel economy.

If the running conditions such as the throttle opening and the engine speed are the same, EGR during homogenous stoichiometric combustion reduces the amount of new air drawn into the engine. Specifically, the difference of the new air represents the amount of recirculated exhaust, or the EGR amount. The reduced amount of new air lowers the torque of the engine. Thus, in some engines, when homogeneous stoichiometric combustion is performed with EGR, the throttle opening is widened compared to when homogeneous stoichiometric combustion is performed without EGR. Accordingly, the torque loss due to EGR is compensated for.

In an engine that switches combustion modes, the torque is adjusted by controlling fuel injection amount during stratified lean combustion mode. Also, the torque is adjusted by controlling the throttle opening, or by controlling the amount of intake air, during homogeneous stoichiometric combustion. That is, the control values used for adjusting the torque vary depending on combustion modes. Thus, if the torque of the engine is not properly controlled, the torque is abruptly changed when the combustion mode is switched, which degrades the drivability.

SUMMARY OF THE INVENTION

Accordingly, it is an objective of the present invention to provide a controlling apparatus and a method of an internal combustion engine that prevents the torque from abruptly changing when the combustion mode is switched under constant running conditions.

To achieve the foregoing and other objectives and in accordance with the purpose of the present invention, a controlling apparatus of an engine that generates torque by combusting air fuel mixture in a combustion chamber is provided. The engine operates in a combustion mode selected from a homogeneous stoichiometric combustion mode and a stratified lean combustion mode. The homogeneous stoichiometric combustion mode includes a first homogeneous mode and a second homogeneous mode. When the engine operates in one of the first and second homogeneous modes, EGR control, in which some of exhaust gas is recirculated to the combustion chamber, is performed. When the engine operates in the other of the first and second homogeneous modes, EGR control is not performed. The apparatus includes computing means, intake air control means and fuel control means. The computing means computes a torque reflecting value based on the running state of the engine. The torque reflecting value reflects an engine torque demanded when the engine operates in the first homogeneous mode. When the engine operates in the homogeneous stoichiometric combustion mode, the intake air control means controls the amount of intake air drawn into the combustion chamber thereby adjusting the engine torque. When the engine operates in the first homogeneous mode, the intake air control means controls the intake air amount based on the torque reflecting value. When the engine operates in the second homogeneous mode, the intake air control means modifies the torque reflecting value for compensating for the difference of the engine torque between the first and second homogeneous modes due to whether EGR control is performed. The intake air control means controls the intake air amount based on the modified torque reflecting value. When the engine operates in the stratified lean combustion mode, the fuel control means controls the amount of fuel supplied to the combustion chamber based on the torque reflecting value thereby adjusting the engine torque.

The present invention may also be embodied as a method for controlling an engine that generates torque by combusting air fuel mixture in a combustion chamber. The engine operates in a combustion mode selected from a homogeneous stoichiometric combustion mode and a stratified lean combustion mode. The homogeneous stoichiometric combustion mode includes a first homogeneous mode and a second homogeneous mode. When the engine operates in one of the first and second homogeneous modes, EGR control, in which some of exhaust gas is recirculated to the combustion chamber, is performed. When the engine operates in the other of the first and second homogeneous modes, EGR control is not performed. The method includes computing a torque reflecting value based on the running state of the engine, the torque reflecting value reflecting an engine torque demanded when the engine operates in the first homogeneous mode, controlling the amount of intake air drawn into the combustion chamber based on the torque reflecting value thereby adjusting the engine torque when the engine operates in the homogeneous stoichiometric combustion mode, modifying the torque reflecting value when the engine operates in the second homogeneous mode thereby compensating for the difference of the engine torque between the first and second homogeneous modes due to whether EGR control is performed, wherein, when the engine operates in the second homogeneous mode, the intake air amount is controlled based on the modified torque reflecting value, and controlling the amount of fuel supplied to the combustion chamber based on the torque reflecting value when the engine operates in the stratified lean combustion mode thereby adjusting the engine torque.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a flowchart showing a routine for computing an actual load ratio KL[0];

FIG. 5 is a flowchart showing a routine for computing a hypothetical load ratio KL[1];

FIG. 6 is a graph showing changes of a hypothetical throttle opening TA1, a target EGR throttle opening TA2 and a target stratified mode throttle opening TA3 when an acceleration pedal depression degree ACCP is changed under a constant engine speed NE;

FIG. 7 is a flowchart showing a routine for computing a final throttle opening TAfin; and FIGS. 8(a) to 8(g) are timing charts showing the values of EGR mode FMODE1, throttle mode FMODE2, injection mode FMODE3, a target EGR opening Et, EGR flag F, the final throttle opening TAfin and decrease factor Kegr[0] when the combustion mode is changed.

DETAILED DESCRIPTION OF THE PREFERRED EMBODIMENTS

A controlling apparatus according to one embodiment of the present invention will now be described with reference to FIGS. 1 to 8. The controlling apparatus is used for a vehicle engine 11.

Figure 1:
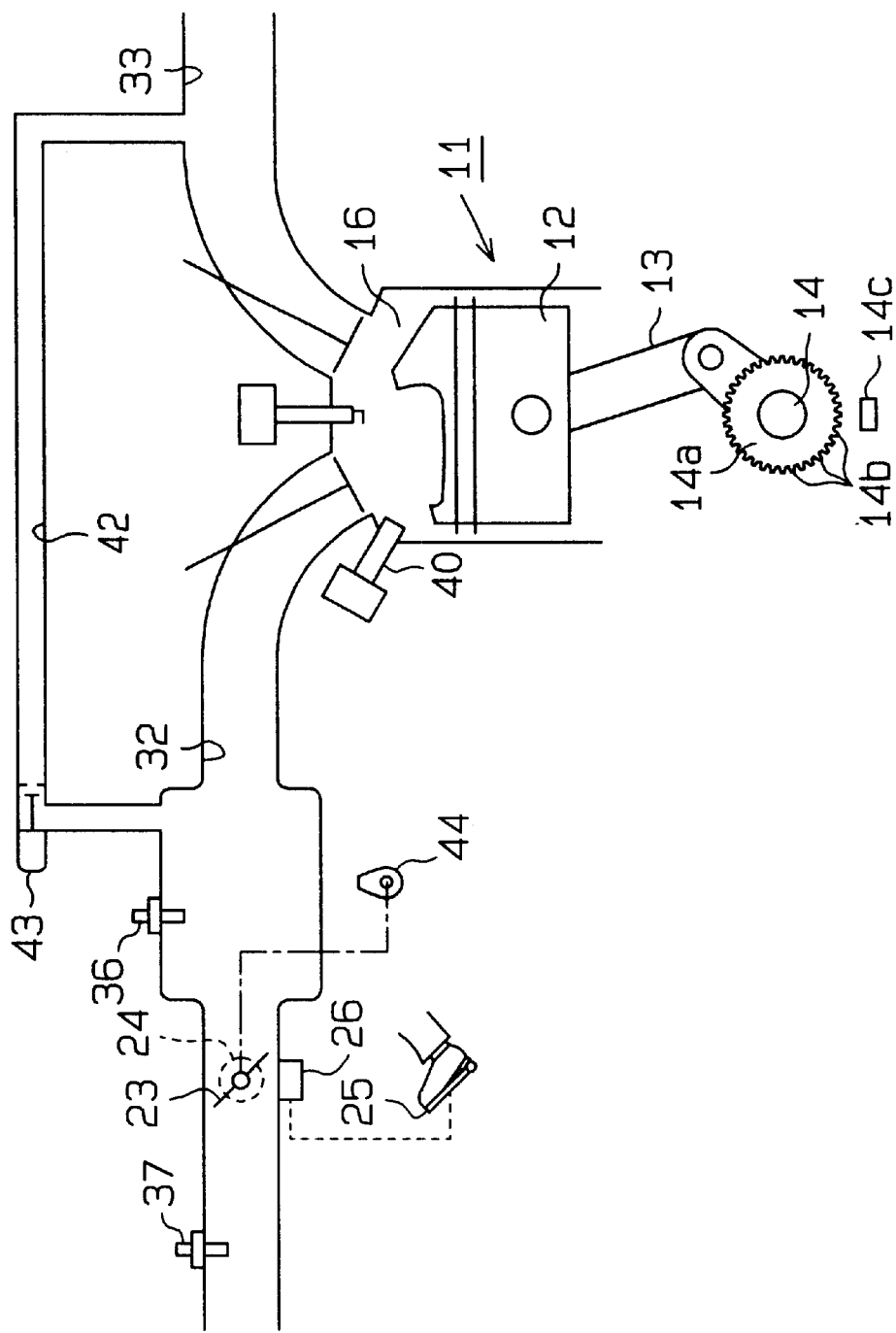
FIG. 1 is a schematic, cross-sectional view illustrating an engine controlled by a controlling apparatus according to one embodiment of the present invention.

As shown in FIG. 1, a piston 12 of the engine 11 is coupled to a crankshaft 14 by a connecting rod 13. Reciprocation of the piston 12 is converted into rotation of the crankshaft 14 by the connecting rod 13. A signal rotor 14a is coupled to the crankshaft 14. The signal rotor 14a has teeth 14b. A crank position sensor 14c is located in the vicinity of the signal rotor 14a. The sensor 14c outputs pulse signals, each of which corresponds to one of the teeth 14b.

A combustion chamber 16 of the engine 11 is connected to an intake passage 32 and an exhaust passage 33. A throttle valve 23 is located in an upstream part of the intake passage 32 to adjust the flow rate of intake air. The opening degree of the throttle valve 23 is adjusted by a throttle motor 24, which is actuated in accordance with depression degree of an acceleration pedal 25. Specifically, the depression degree of the acceleration pedal 25 is detected by an acceleration pedal position sensor 26, and the throttle motor 24 is controlled based on the detected pedal depression degree, which adjusts the opening degree of the throttle valve 23. The opening degree of the throttle valve 23 is detected by a throttle position sensor 44. A vacuum sensor 36 is located downstream of the throttle valve 23 in the intake passage 32. The vacuum sensor 36 detects the pressure in the intake passage 32, or the intake pressure. An intake air temperature sensor 37 is located upstream of the throttle valve 23 in the intake passage 32. The intake air temperature sensor 37 detects the temperature in the intake passage 32, or intake air temperature.

The engine 11 has a fuel injector 40, which directly injects fuel into the combustion chamber 16 for forming air-fuel mixture. When air-fuel mixture is combusted in the combustion chamber 16, the piston 12 is reciprocated and the crankshaft 14 is rotated, which drives the engine 11. After being combusted, the air-fuel mixture is sent to the exhaust passage 33. An exhaust gas recirculation (EGR) passage 42 is connected to the exhaust passage 33. The EGR passage 42 is also connected to the intake passage 32 and sends exhaust from the exhaust passage 33 to the intake passage 32. The flow rate of recirculated exhaust gas, or EGR amount, is regulated by an EGR valve 43, which is located in the EGR passage 42. Performing EGR lowers the temperature in the combustion chamber 16 and suppresses the generation of nitrogen oxide (NOx). Accordingly, the emission of NOx is reduced.

Figure 2:
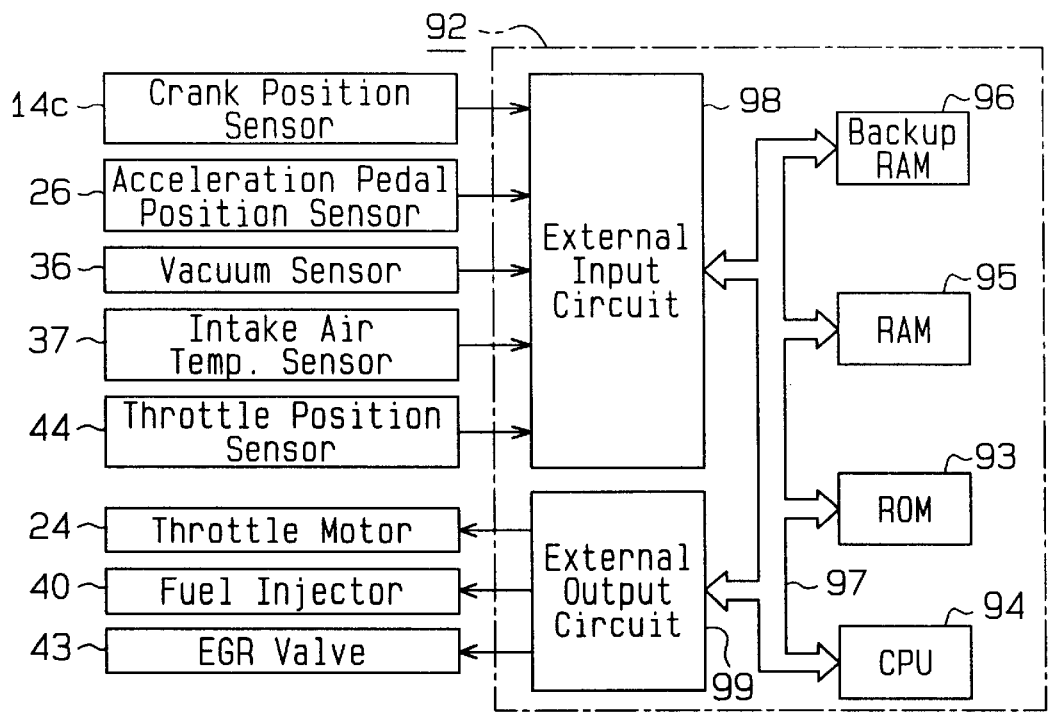
FIG. 2 is a block diagram, showing an electrical construction of the controlling apparatus of FIG. 1.

The electric construction of the engine 11 will now be described with reference to FIG. 2.

The controlling apparatus includes a controller, which is an electronic control unit (ECU) 92 in this embodiment. The ECU 92 controls the running conditions of the engine 11. Specifically, the ECU 92 controls the combustion mode, the fuel injection amount, the opening degree of the throttle valve 23, the opening degree of the EGR valve 43. The ECU 92 is a logic circuit including a ROM 93, a CPU 94, a RAM 95 and a backup RAM 96.

The ROM 93 stores various control programs and maps used in the programs. The CPU 94 executes various computations based on the programs and the maps stored in the ROM 93. The RAM 95 temporarily stores the result of the computations and data from various sensors. The backup RAM 96 is a non-volatile memory that stores necessary data when the engine 11 is stopped. The ROM 93, the CPU 94, the RAM 95 and the backup RAM 96 are connected to one another by a bus 97. The bus 97 also connects the ROM 93, the CPU 94, the RAM 95 and the backup RAM 96 to an external input circuit 98 and an external output circuit 99.

The external input circuit 98 is connected to the crank position sensor 14c, the pedal position sensor 26, the vacuum sensor 36 and the throttle position sensor 44. The external output circuit 99 is connected to the throttle motor 24, the fuel injector 40 and the EGR valve 43.

The ECU 92 switches the combustion mode of the engine 11 between homogeneous stoichiometric combustion and stratified lean charge combustion based on the running conditions of the engine 11. For example, when the load on the engine 11 is high, the ECU 92 performs homogenous stoichiometric combustion, in which fuel mixture of air and homogeneously mixed fuel is combusted, so that the engine 11 produces necessary power. When the load on the engine 11 is low, the ECU 92 performs stratified lean combustion, in which the air-fuel ratio of air-fuel mixture is significantly leaner than the stoichiometric air-fuel ratio, to improve the fuel economy of the engine 11. In stratified lean combustion, fuel is stratified in the combustion chamber 16.

The control procedures of stoichiometric combustion and stratified lean combustion will now be described.

Homogeneous Stoichiometric Combustion (a) Throttle Opening Control

In homogeneous stoichiometric combustion mode, the ECU 92 computes a target homogeneous mode throttle opening degree TA1, which is suitable for homogeneous stoichiometric combustion without EGR, based on information such as the acceleration depression degree ACCP detected by the pedal position sensor 26. The target homogeneous mode throttle opening TA1 is a torque reflecting value that reflects the demanded engine torque. The ECU 92 sets the target homogeneous mode throttle opening TA1 as a final throttle opening TAfin and controls the throttle motor 24 based on the final throttle opening TAfin. Accordingly, the opening of the throttle valve 23 is adjusted to a degree that is suitable for homogeneous stoichiometric combustion without EGR. As the depression degree of the acceleration pedal 25 is changed, the throttle opening is changed, accordingly. As a result, the intake pressure of the engine 11 and the amount of intake air, which correlates with the intake pressure, are changed.

(b) Fuel Injection Amount Control

The ECU 92 computes a fuel injection amount instruction value based on the engine speed NE, which is detected based on signals of the crank position sensor 14c, and a load ratio KL, which will be discussed below. The ECU 92 then controls the fuel injector 40 to inject fuel the amount of which corresponds to the fuel injection amount instruction value into the combustion chamber 16. The ECU 92 controls the fuel injector 40 to inject fuel during the suction stroke of the engine 11. The injection forms air-fuel mixture the state of which is stoichiometric or richer than the stoichiometric. The injection instruction value increases as the load ratio KL increases. Therefore, as the load ratio KL increases, the amount of fuel injected from the fuel injector 40 increases, which increases the torque of the engine 11.

The load ratio KL is used for computing the injection instruction value. The load ratio KL represents the ratio of the current load to the maximum engine load. During homogeneous stoichiometric combustion, the actual load ratio KL[0] is used as the load ratio KL. The actual load ratio KL[0] is computed based on the engine speed NE and the actual intake pressure PMr in the intake passage 32. The actual intake pressure PMr is computed based on the intake pressure PM, which is detected by the vacuum sensor 36, the actual throttle opening degree TAr, which is detected by the throttle position sensor 44, the engine speed NE and other values. The intake pressure is a parameter that correlates with the amount of air drawn into the combustion chamber 16.

During homogeneous stoichiometric combustion, the throttle opening is controlled in accordance with the acceleration pedal depression degree ACCP to control the actual intake pressure PMr, which represents the actual amount of intake air. The injection amount from the fuel injector 40 is changed, accordingly, and the output torque of the engine 11 seeks a demanded value.

(c) EGR Opening Control

The ECU 92 computes a target EGR opening degree Et based on the actual throttle opening degree TAr and the engine speed NE and controls the EGR valve 43 based on the target EGR opening degree Et. The EGR amount is thus controlled. During homogeneous stoichiometric combustion, the EGR valve opening is set greater than zero to perform EGR if the engine 11 is running at a relatively high speed with a relatively great load, or in a region proximate to a region for stratified lean combustion.

Even if the engine 11 is in the above region for EGR, the ECU 92 does not perform EGR if performing EGR is likely to deteriorate the combustion state. For example, when the engine 11 is cold and being cranked or immediately after the combustion mode is switched from stratified lean combustion to homogeneous stoichiometric combustion, the ECU 92 does not perform EGR.

When performing EGR during homogeneous stoichiometric combustion, the ECU 92 sets an EGR flag F, which is used for judging whether exhaust gas is actually recirculated to the intake passage 32. That is, the ECU 92 sets the EGR flag F to one and stores the value of the flag F in a predetermined area of the RAM 95 when exhaust gas is actually being recirculated to the intake passage 32. When EGR is stopped and exhaust gas is not recirculated, the ECU 92 sets the flag F to zero and stores the value in the predetermined area of the RAM 95.

If EGR is performed during homogenous stoichiometric combustion, the amount of new intake air drawn to the combustion chamber 16 is decreased by the amount of recirculated exhaust gas, which may lower the engine's output torque. Therefore, when EGR is performed during homogeneous stoichiometric combustion, or when the flag F is one, the ECU 92 increases the final throttle opening TAfin compared to when EGR is not performed. Specifically, the ECU 92 increases the final throttle opening TAfin by an opening adjustment value TAo, which will be discussed below. The ECU 92 thus compensates for the decrease of the output torque due to EGR.

Stratified Lean Combustion (a) Throttle Opening Control

During stratified lean combustion, the ECU 92 computes target stratified mode throttle opening TA3 based on load ratio KL (specifically load ratio KLQ), which will be discussed later. The target stratified mode throttle opening TA3 is suitable for stratified lean combustion. The ECU 92 sets the target stratified mode throttle opening TA3 as the final throttle opening TAfin and controls the throttle motor 24 based on the final throttle opening TAfin. Accordingly, the opening of the throttle valve 23 is adjusted for stratified lean combustion.

If the running conditions of the engine 11 are the same, the final throttle opening TAfin is set wider during stratified lean combustion than during homogeneous stoichiometric charge combustion without EGR. Thus, lean stratified combustion decreases the pumping loss of the engine compared to homogeneous stoichiometric combustion, which improves the fuel economy.

During stratified lean combustion, a hypothetical load ratio KL[1] is computed. The hypothetical load ratio KL[1] corresponds to the actual load ratio KL[0] that is computed on the supposition that homogeneous stoichiometric combustion without EGR is performed at the current acceleration pedal depression degree ACCP. A load ratio KLQ is computed based on the hypothetical load ratio KL[1]. The load ratio KLQ is used as the load ratio KL, which is used for computing the target stratified mode throttle opening TA3. The hypothetical load ratio KL[1] is computed based on a hypothetical throttle opening and the engine speed NE. The hypothetical throttle opening corresponds to the target homogeneous mode throttle opening TA1 that is computed on the supposition that homogeneous stoichiometric combustion without EGR is performed at the current acceleration pedal depression degree ACCP. That is, during stratified lean combustion, the target homogeneous mode throttle opening TA1, which is suitable for performing homogeneous stoichiometric combustion without EGR at the current acceleration pedal depression degree ACCP, is computed as the hypothetical throttle opening.

In either combustion mode, the target homogeneous mode throttle opening TA1, which is suitable for performing homogeneous stoichiometric combustion without EGR at the current acceleration pedal depression degree ACCP, is always computed regardless whether EGR is being performed. The target homogeneous mode throttle opening TA1 that is computed during stratified lean combustion will be referred to hypothetical throttle opening. Hereinafter, like the target homogeneous mode throttle opening, the hypothetical throttle opening will be represented by TA1.

The hypothetical load ratio KL[1] is computed as follows. First, a hypothetical intake pressure PMv is computed based on the hypothetical throttle opening TA1, the engine speed NE and other values. The hypothetical intake pressure PMv corresponds to an intake pressure when homogeneous stoichiometric combustion without EGR is performed at the hypothetical throttle opening TA1. The hypothetical intake pressure PMv is used for computing the hypothetical load ratio KL[1].

(b) Fuel Injection Control

The ECU 92 computes the fuel injection instruction value 1based on the load ratio KL (specifically load ratio KLQ) and the engine speed NE, and controls the fuel injector 40 to inject fuel the amount of which corresponds to the instruction value into the combustion chamber 16. The ECU 92 controls the fuel injector 40 to inject fuel during compression stroke of the engine 11 to form stratified air-fuel mixture in the combustion chamber 16. The fuel injection instruction value increases as the load ratio KL, or the hypothetical load ratio KL[1] (load ratio KLQ) increases. Therefore, as the fuel injection instruction value increases, the fuel injection 40 injects greater amount of fuel, which increases the engine torque 11.

Therefore, during stratified lean combustion, the fuel injection amount is controlled in accordance with the acceleration pedal depression degree ACCP. Accordingly, the output torque of the engine 11 seeks a demanded value. During stratified lean combustion, the fuel injection amount is controlled by using the hypothetical load ratio KL[1], which is computed based on the hypothetical throttle opening TA1 and hypothetical intake pressure PMv. Like during homogeneous stoichiometric combustion without EGR, the fuel injection amount is adjusted based on the throttle opening TA1, or the intake air amount during stratified lean combustion. Thus, the engine output torque is adjusted based on a common control value, which is the throttle opening TA1 both in stratified lean combustion and in homogeneous stoichiometric combustion without EGR. Therefore, when the combustion mode is switched under the same running conditions, the torque is not abruptly changed, which prevents the drivability from being degraded.

(c) EGR Opening Control

The ECU 92 computes a target EGR opening Et based on the load ratio KL (specifically load ratio KLQ) and the engine speed NE, and controls the EGR valve 43 based on the target EGR opening Et. The EGR amount is adjusted accordingly. During stratified lean combustion, the ECU 92 does not perform EGR if the engine 11 is relatively cold. The combustion state is therefore not deteriorated due to EGR.

As described above, the injection amount, the throttle opening and the EGR opening are controlled in different manners according to the combustion mode of the engine 11. When the combustion mode of the engine 11 is switched between stratified lean combustion and homogeneous stoichiometric combustion, the procedures for controlling the injection amount, the throttle opening and the EGR opening are switched.

The control procedures of the fuel injection amount, the throttle opening and the EGR opening are switched in accordance with the values of fuel injection mode FMODE3, throttle mode FMODE2 and EGR mode FMODE1. The ECU 92 sets the value of the modes FMODE1–3, for example, to zero, which represents stratified lean combustion, and twelve, which represents homogeneous stoichiometric combustion.

When EGR mode FOMODE1 is switched between zero and twelve, the control procedure for the EGR opening is switched between the stratified lean combustion mode and the homogeneous stoichiometric combustion mode. When the throttle mode FMODE2 is switched between zero and twelve, the control procedure for the throttle opening is switched between the stratified lean combustion mode and the homogeneous stoichiometric combustion mode. When the injection mode FMODE3 is switched between zero and twelve, the control procedure for the fuel injection amount is switched between the stratified lean combustion and the homogeneous stoichiometric combustion mode.

The ECU 92 switches the modes FMODE1–FMODE3 at predetermined intervals. This is because the actual EGR opening, the actual throttle opening and the actual fuel injection amount respond to the changes of the modes FMODE1–FMODE3 after different time lags. That is, the time lag between a change of the mode and the actual value is greater in order of the fuel injection amount, the intake air amount and the EGR amount. The modes FMODE1–FMODE3 are switched by considering the different time lags.

The routine for computing the load ratio KL, which is used in various control procedures in stratified lean combustion and homogeneous stoichiometric combustion, will now be described with reference to the flowchart of FIG. 3. This routine is an interrupt executed by the ECU 92 at predetermined time intervals in all the combustion modes.

Figure 3:
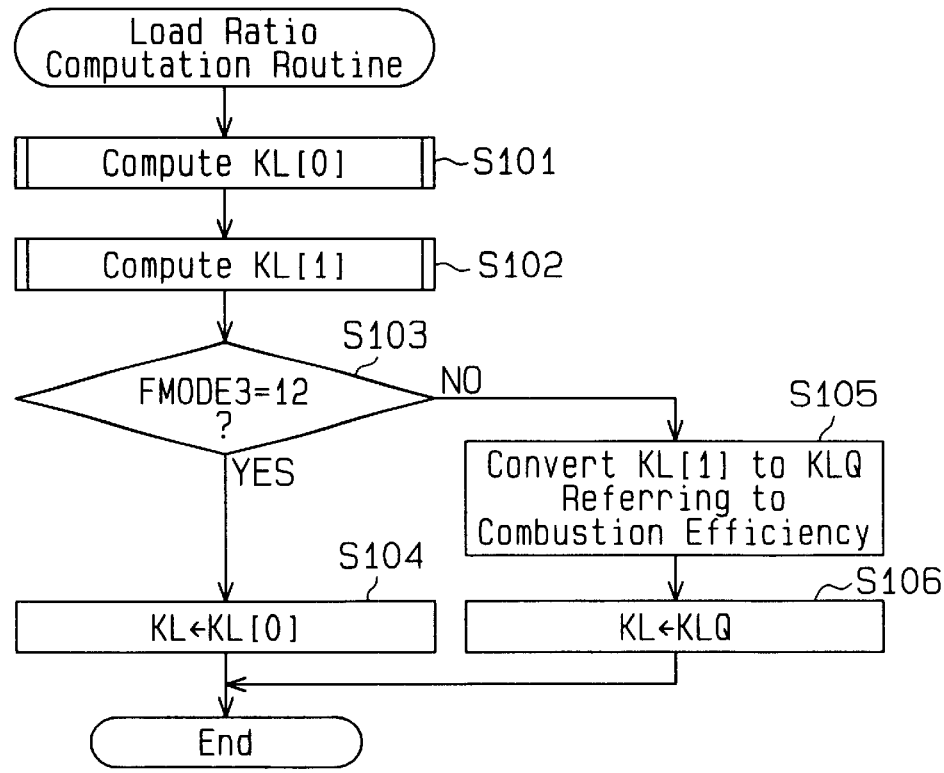
FIG. 3 is a flowchart showing a routine for computing a load ratio KL.

In step S101 of the routine of FIG. 3, the ECU 92 computes the actual load ratio KL[0]. In step S102, the ECU 92 computes the hypothetical load ratio KL[1].

The actual load ratio KL[0] represents the actual load ratio of the engine 11. The hypothetical load ratio KL[1] is computed on the supposition that homogeneous stoichiometric combustion without EGR is performed at the current acceleration depression degree ACCP. That is, the hypothetical load ratio KL[1] corresponds to the actual load ratio KL[0] when homogeneous stoichiometric combustion without EGR is performed at the current acceleration pedal depression degree. The actual load ratio KL[0] and the hypothetical load ratio KL[1] are always computed regardless of the current combustion mode. Therefore, when homogeneous stoichiometric combustion without EGR is performed, the actual load ratio KL[0] is equal to the hypothetical load ratio KL[1].

Steps S103–S106 of the routine of FIG. 3 are executed for determining which of the load ratio KL[0] and the load ratio KLQ, which is computed based on the hypothetical load ratio KL[1], should be used as the load ratio KL in various control procedures. Steps S103–S106 are executed based on the value of the injection mode FMODE3.

In step S103, the ECU 92 judges whether the injection mode FMODE3 is twelve, which represents homogeneous stoichiometric combustion. If the injection mode FMODE3 is twelve, the ECU 92 proceeds to step S104 and sets the load ratio KL to the actual load ratio KL[0]. If the injection mode FMODE3 is not twelve, the ECU 92 proceeds to step S105 and converts the hypothetical load ratio KL[1] into the load ratio KLQ. In step S106, the ECU 92 sets the load ratio KL to the to the load ratio KLQ. After computing the load ratio KL either in step S104 or step S106, the ECU 92 temporarily suspends the current routine.

In step S105, the hypothetical load ratio KL[1] is converted into the load ratio KLQ based on the engine speed NE by considering the difference in combustion efficiency between stratified lean combustion and homogeneous stoichiometric combustion. The efficiency by which combustion energy of air-fuel mixture is converted into the engine output torque is different between stratified lean combustion and homogeneous stoichiometric combustion. Thus, if the hypothetical load ratio KL[1], which is computed on the supposition that homogeneous stoichiometric combustion is performed, is used as the load ratio KL in stratified lean combustion, the control procedures are not properly performed due to the difference in the combustion efficiency. Therefore, in step S105, the hypothetical load ratio KL[1] is converted into the load ratio KLQ by considering the difference in the combustion efficiency. The load ratio KLQ computed in step S105 is used as the load ratio KL in several control procedures during stratified lean combustion, which permits the procedures to be properly performed. As described above, the hypothetical load ratio KL[1] is converted into the load ratio KLQ based on the engine speed NE. This is because the difference in the combustion efficiency between stratified lean combustion and homogeneous stoichiometric combustion changes in accordance with the engine speed NE.

The computation of the actual load ratio KL[0] in step S101 of the load ratio computation routine will now be described with reference to the flowchart of FIG. 4.

In step S201, the ECU 92 computes the actual intake pressure PMr based on the intake pressure PM, the actual throttle opening TAr and the engine speed NE. In step S202, the ECU 92 computes the filling efficiency ηc based on a value PMr/PA, which is computed by dividing the actual intake pressure PMr by the atmospheric pressure PA. The atmospheric pressure PA is computed based on the intake pressure PM before the engine 11 is started.

In step S203, the ECU 92 computes the intake temperature correction factor Ktha based on the intake temperature THA, which is detected by the intake temperature sensor 37. The intake temperature correction factor Ktha is increased and decreased from 1.0 according to the intake temperature THA. In step S204, the ECU 92 computes the decreasing amount coefficient Kegr[0] based on the EGR ratio, or the ratio of recirculated gas to gas drawn into the combustion chamber 16.

The decrease factor Kegr[0] varies and the maximum value is 1.0. As the EGR ratio increases, the ratio of new air drawn into the combustion chamber 16 is decreased. Accordingly, the actual load ratio KL[0] is decreased to decrease the fuel injection amount. Thus, the air-fuel ratio is maintained to stoichiometric value during homogeneous stoichiometric combustion. When the EGR ratio gradually increases due to performance of the EGR or when the EGR ratio gradually decreases due to discontinuation of the EGR, the ECU 92 gradually changes the decrease factor Kegr[0] in accordance with change of the EGR ratio.

In step S205, the ECU 92 computes the actual load ratio KL[0] based on the actual intake pressure PMr, the filling efficiency ηc, the intake temperature correction factor Ktha and the decrease factor Kegr[0] by using the equation (1). Thereafter, the ECU 92 temporarily suspends the routine of FIG. 4 and returns the routine of FIG. 3.

$$KL[0]=\eta c \cdot Ktha \cdot (PMr/\text{one atmospheric pressure}) \cdot Kegr[0] \quad (1)$$

Computation of the hypothetical load ratio KL[1] in step S102 of FIG. 3 will now be described with reference to the flowchart of FIG. 5.

Ins step S301, the ECU 92 computes the hypothetical intake pressure PMv based on the hypothetical throttle opening TA1 and the engine speed NE. If the current combustion mode is homogeneous stoichiometric combustion, the target homogeneous mode throttle opening TA1, which represents the hypothetical throttle opening TA1, is used for computing the hypothetical intake pressure PMv. In step S302, the ECU 92 computes the filling efficiency ηc based on the engine speed NE and a value PMv/PA, which is computed by dividing the hypothetical intake pressure PMv by the atmospheric pressure PA.

In step S303, the ECU 92 computes the intake temperature correction factor Ktha based on the intake temperature THA. In step S304, the ECU 92 sets the decrease factor Kegr[1] to 1.0. In other words, the decrease factor Kegr[1] is fixed. This is because, unlike homogeneous stoichiometric combustion, air-fuel ratio need not be adjusted to the stoichiometric value in stratified lean combustion.

The ECU 92 computes the hypothetical load ratio KL[1] based on the hypothetical intake pressure PMv, the filling efficiency ηc, the intake temperature correction factor Ktha and the decrease factor Kegr[1] by using the equation (2). Thereafter, the ECU 92 temporarily suspends the routine of FIG. 5 and returns the routine of FIG. 3.

$$KL[1]=\eta c \cdot Ktha \cdot (PMv/\text{one atmospheric pressure}) \cdot Kegr[1] \quad (2)$$

The adjustment of torque of the engine 11 in homogeneous stoichiometric combustion and in stratified lean combustion will now be described with reference to FIG. 6.

In FIG. 6, double dashed chain line L1 represents the relationship between the hypothetical throttle opening TA1 and the acceleration pedal depression degree ACCP when the engine speed NE is constant. As described above, the hypothetical throttle opening TA1 is computed as the target homogeneous mode throttle opening TA1 in a region to perform homogeneous stoichiometric combustion.

The hypothetical load ratio KL[1] is computed based on the hypothetical throttle opening TA1, or on the target homogeneous mode throttle opening TA1. In a region of stratified lean combustion, the stratified mode throttle opening TA3 is computed based on the load ratio KLQ, which is computed based on the hypothetical load ratio KL[1]. The stratified mode throttle opening TA3 is represented by solid line L3. The target stratified mode throttle opening TA3 is used as the final throttle opening TAfin, and the throttle opening is controlled based on the final throttle opening TAfin. In stratified lean combustion, the fuel injection amount is controlled in accordance with the hypothetical load ratio KL[1] (specifically load ratio KLQ), which is computed based on the hypothetical throttle opening TA1. Accordingly, the torque of the engine 11 is adjusted.

If EGR is not being performed in the homogeneous stoichiometric combustion region, the throttle opening TA1 is used as the final throttle opening TAfin. If EGR is being performed, an opening adjustment value TAo, which will be discussed below, is added to the throttle opening TA1. The resultant is referred to as an target EGR throttle opening TA2 and represented by solid line L2 in FIG. 6. The EGR throttle opening TA2 is used as the final throttle opening TAfin. Then, the throttle opening is controlled based on the final throttle opening TAfin, which changes the actual intake pressure PMr (the actual intake air amount). Accordingly, the actual load ratio KL[0], which is computed based on the actual intake pressure PMr, is changed. As a result, the fuel injection amount, which is computed based on the actual load ratio KL[0], is changed. The output torque of the engine 11 is changed, accordingly. Therefore, in homogeneous stoichiometric combustion, the final throttle opening TAfin is determined based on the throttle opening TA1, and the determined final throttle opening TAfin is used for controlling the torque of the engine 11.

The torque of the engine 11 is adjusted according to the target throttle opening TA1, or the hypothetical throttle opening TA1, in stratified lean combustion, in homogeneous stoichiometric combustion without EGR and in homogeneous stoichiometric combustion with EGR. In other words, the engine torque is controlled based on a common control value, which is the throttle opening TA1, in stratified lean combustion and in homogeneous stoichiometric combustion without EGR. Therefore, when the combustion mode is switched under constant running conditions, the engine torque is not suddenly changed. Further, the engine torque is controlled based on a common control value, which is the throttle opening TA1, both in homogeneous stoichiometric combustion with EGR and in stratified lean combustion. Therefore, when the combustion mode is switched, the engine torque is not suddenly changed.

The computation of the final throttle opening TAfin will now be described with reference to the flowchart of FIG. 7.

This routine is an interrupt executed by the ECU 92 at predetermined time intervals in all the combustion modes.

In step S401, the ECU 92 computes the target homogeneous mode throttle opening TA1, or the hypothetical throttle opening TA1, by using the following equation (3).

$$TA1 = TAbase + TAisc \quad (3)$$

TAbse represents a basic throttle opening that is computed based on the acceleration pedal depression degree ACCP. TAisc represents ISC opening, or the amount of the throttle opening that is used for controlling the idle speed.

In step S402, the ECU 92 computes the target EGR throttle opening TA2 by using the following equation (4).

$$TA2 = TA1 + TAo \quad (4)$$

The ECU 92 adds the opening adjustment value TAo to the target homogeneous mode throttle opening TA1 to obtain the target EGR throttle opening TA2. The opening adjustment value TAo is computed based on the target homogeneous mode throttle opening TA1 and the engine speed NE. The EGR opening (EGR amount) in homogeneous stoichiometric combustion is determined in accordance with the target homogeneous mode throttle opening TA1 and the engine speed NE. Thus, computing the opening adjustment value TAo based on the target homogeneous mode throttle opening TA1 and the engine speed NE compensates for a decrease of the output torque due to EGR.

In step S403, the ECU 92 judges whether the throttle mode FMODE2 is zero (stratified lean combustion). If the throttle mode FMODE2 is zero, the ECU 92 proceeds to step S404. In step S404, the ECU 92 sets the target stratified mode throttle opening TA3, which is suitable for stratified lean combustion, as the final throttle opening TAfin. Thereafter, the ECU 92 temporarily suspends the routine of FIG. 7.

If the throttle mode FMODE2 is twelve (homogeneous stoichiometric combustion), in step S403, the ECU 92 proceeds to step S405. In step S405, the ECU 92 judges whether the EGR flag F is one, or whether EGR is being performed.

If the EGR flag is one, or if the current combustion mode is homogeneous stoichiometric combustion with EGR, the ECU 92 proceeds to step S406. In step S406, the ECU 92 sets the target EGR throttle opening TA2 as the final throttle opening TAfin. If the EGR flag is not one, or if the current combustion mode is homogeneous stoichiometric combustion without EGR, the ECU 92 moves to step S407. In step S407, the ECU sets the target homogeneous mode throttle opening TA1 as the final throttle opening TAfin. After executing either step S406 or step S407, the ECU 92 temporarily suspends the routine of FIG. 7.

Changes of the EGR mode FMODE1, the throttle mode FMODE2, the injection mode FMODE3, the target EGR opening Et, the EGR flag F, the final throttle opening TAfin and the decrease factor Kegr[0] when the combustion mode is changed in the order of stratified lean combustion, homogeneous stoichiometric combustion and stratified lean combustion will now be described with reference to the timing charts of FIGS. 8(*a*) to 8(*g*).

Stratified Lean Combustion to Homogeneous Stoichiometric Combustion

When the combustion mode is switched from stratified lean combustion to homogeneous stoichiometric combustion, the EGR mode FMODE1, the throttle mode FMODE2, the injection mode FMOdE3 are consecutively changed from zero, which represents stratified lean combustion, to twelve, which represents homogeneous stoichiometric combustion, as shown in FIGS. 8(*a*) to 8(*c*).

If the EGR mode FMODE1 is changed from zero to twelve during stratified lean combustion with EGR, the target EGR opening Et is temporarily changed to zero from a value that is suitable for stratified lean combustion as shown in FIG. 8(*d*). This is because the combustion state of the engine 11 may be deteriorated if EGR is performed immediately after the combustion mode is switched from stratified lean combustion to homogeneous stoichiometric combustion.

In stratified lean combustion or homogenous stoichiometric combustion without EGR, the EGR flag F is set to zero, which indicates that EGR is not being performed, as shown in FIG. 8(*e*).

When the throttle mode FMODE2 is switched from zero to twelve, the final throttle opening TAfin is changed as shown by solid line in FIG. 8(*f*). Specifically, the final throttle opening TAfin is changed from a value that is suitable for stratified lean combustion to a value that is suitable for homogeneous stoichiometric combustion without EGR.

When the throttle mode FMODE2 is zero, which represents stratified lean combustion, the target stratified mode throttle opening TA3 is used as the final throttle opening TAfin. If the throttle mode FMODE2 is twelve, which represents homogeneous stoichiometric combustion, and EGR flag is zero, the target homogeneous mode throttle opening TA1, which corresponds to the hypothetical throttle opening TA1, is used as the final throttle opening TAfin.

As shown by dashed line in FIG. 8(*f*), the hypothetical throttle opening TA1 is always computed as the target homogeneous mode throttle opening TA1, which is suitable for homogeneous stoichiometric combustion without EGR, based on the acceleration pedal depression degree ACCP and other values regardless of the combustion mode and regardless of whether EGR is being performed.

When the injection mode FMODE3 is changed from zero, which represents stratified lean combustion, to twelve, which represents homogeneous stoichiometric combustion, the load ratio KL, which is used for controlling the injection amount, is changed from the load ratio KLQ, which is computed based on the hypothetical load ratio KL[1], to the actual load ratio KL[0].

The hypothetical load ratio KL[1] is computed based on the hypothetical throttle opening TA1 (hypothetical intake pressure PMv) and other values. Regardless of the current combustion mode and regardless whether EGR is currently performed, the hypothetical load ratio KL[1] is always computed. The actual load ratio KL[0] corresponds to the actual intake pressure PMr, which is changed in accordance with the throttle opening based on the final throttle opening TAfin. The actual load ratio KL[0] is always computed based on the actual intake pressure PMr.

When the injection mode FMODE3 is zero, which represents stratified lean combustion, the engine torque is adjusted by controlling the fuel injection amount based on the hypothetical load ratio KL[1] (load ratio KLQ). When the injection mode FMODE3 is twelve, which represents homogeneous stoichiometric combustion, the engine torque is adjusted by controlling the throttle opening (intake air amount). That is, if the actual intake pressure PMr (actual intake air amount) is changed due to a change of the throttle opening, the actual load ratio KL[0] is changed, which changes the fuel injection amount. Accordingly, the engine output torque is adjusted.

Since the hypothetical load ratio KL[1] is computed based on the hypothetical throttle opening TA1 (hypothetical intake pressure PMv), the engine output torque is adjusted based on the hypothetical throttle opening TA1 during stratified lean combustion. Therefore, the engine torque is adjusted based on a common control value both in stratified lean combustion and in homogeneous stoichiometric combustion without EGR. The common control value is the throttle opening (intake air amount) in homogeneous stoichiometric combustion without EGR. Therefore, when the combustion mode is switched from stratified lean combustion to homogeneous stoichiometric combustion without EGR under the constant running conditions, the engine torque is not suddenly changed, which prevents the drivability from being degraded.

Immediately before and after the combustion state is switched from stratified lean combustion to homogeneous stoichiometric combustion without EGR, the torque is adjusted in accordance with the hypothetical throttle opening TA1. Therefore, when the combustion mode is switched, the torque is not suddenly changed.

After FMODE1–FMODE3 are set to twelve, which represents homogeneous stoichiometric combustion, EGR is performed if the running state of the engine 11 is in a region to perform EGR and EGR can be performed. That is, as shown in FIG. 8(d), the target EGR opening Et is changed from zero to a value that is suitable for the current running state. Accordingly, exhaust gas is recirculated to the intake passage 32 after a certain delay.

When EGR is being performed, the EGR flag F is changed from zero to one as shown in FIG. 8(e) as exhaust is actually sent to the intake passage 32. Further, the decrease factor Kegr[0] is gradually changed to a value that is less than one as shown in FIG. 8(g). Changes of the decrease factor Kegr[0] correspond to changes of the EGR rate.

If EGR is performed during homogeneous stoichiometric combustion, the amount of new intake air drawn into the combustion chamber 16 is reduced by the amount that corresponds to the EGR amount. The output torque of the engine 11 is decreased, accordingly. Thus, when EGR is performed during homogeneous stoichiometric combustion, the final throttle opening TAfin is opened wider as shown by solid line in FIG. 8(f) than a case when EGR is not performed. That is, the EGR throttle opening TA2 is computed by adding the opening adjustment value TAo to the throttle opening TA1, and the EGR throttle opening TA2 is used as the final throttle opening TAfin. The engine torque is adjusted in accordance with the widened final throttle opening TAfin, which increases the amount of new air that is drawn into the combustion chamber. In this manner, the reduction of output torque due to EGR is compensated for.

Homogeneous Stoichiometric Combustion to Stratified Lean Combustion

When the combustion mode is switched from homogeneous stoichiometric combustion to stratified lean combustion, the EGR mode FMODE1, the throttle mode FMODE2, the injection mode FMOdE3 are consecutively changed from twelve, which represents homogeneous stoichiometric combustion, to zero, which represents stratified lean combustion, as shown in FIGS. 8(a) to 8(c).

If the EGR mode FMODE1 is changed from twelve to zero during performed in homogeneous stoichiometric combustion with EGR, the target EGR opening Et is changed from a value that is suitable for homogeneous stoichiometric combustion to a value that is suitable for stratified lean combustion as shown in FIG. 8(d). Also, as shown in FIG. 8(e), the EGR flag F is changed from one to zero. Accordingly, the decrease factor Kegr[0] is gradually increased to 1.0 as shown in FIG. 8(g).

When the EGR flag F is changed to zero, the final throttle opening TAfin is changed in accordance with the throttle mode FMODE2. Specifically, the final throttle opening TAfin is changed either to a value that is suitable for homogeneous stoichiometric combustion without EGR or to a value that is suitable for stratified lean combustion. If FMODE2 is zero (stratified lean combustion) when the EGR flag F is changed to zero, the final throttle opening TAfin is changed to the target stratified mode throttle TA3.

If FMODE2 is twelve (homogeneous stoichiometric combustion) when the EGR flag F is changed to zero, the final throttle opening TAfin is set to the target homogeneous mode throttle opening TA1, which is suitable for homogeneous stoichiometric combustion without EGR. As a result, the final throttle opening TAfin is changed to the throttle opening TA1 as shown by solid line in FIG. 8(f). Thereafter, when the throttle mode FMODE2 is changed from twelve (homogeneous stoichiometric combustion) to zero (stratified lean combustion), the final throttle opening TAfin is changed from the target homogeneous throttle valve TA1 to the target stratified mode throttle opening TA3 as shown by solid line in FIG. 8(f).

Immediately before and after the combustion mode is switched from homogeneous stoichiometric combustion with EGR to stratified lean combustion, the throttle opening TA2 is opened wider from the throttle opening TA1 by the opening adjustment value TAo as shown in FIG. 8(f). The engine torque is adjusted, accordingly. That is, in homogeneous stoichiometric combustion with EGR, the torque is adjusted according to the target homogeneous mode throttle opening TA1. When the combustion state is switched from homogeneous stoichiometric combustion to stratified lean combustion, the final throttle opening TAfin can be equal to the throttle opening TA1 as shown in FIG. 8(f). In this case, engine torque is adjusted according the target homogeneous mode throttle opening TA1.

After the combustion mode is switched to stratified lean combustion, the fuel injection amount is controlled in accordance with the hypothetical load ratio KL[1] (load ratio KLQ) to adjust the engine torque. Since the hypothetical load ratio KL[1] is computed based on the hypothetical throttle opening TA1, the hypothetical load ratio KL[1] is changed in accordance with the hypothetical throttle opening TA1. Therefore, in stratified lean combustion, the engine torque is adjusted by referring to the hypothetical throttle opening TA1.

The illustrated embodiment has the following advantages.

(1) In homogeneous stoichiometric combustion without EGR, the output torque of the engine 11 is adjusted by controlling the throttle opening based on the target homogeneous mode throttle opening TA1, which is the torque reflecting value that reflects the demanded engine torque. In stratified lean combustion, the output torque of the engine 11 is adjusted by controlling the hypothetical load ratio KL[1] (load ratio KLQ). The hypothetical load ratio KL[1] (load ratio KLQ) is computed based on the hypothetical throttle opening TA1, which corresponds to the target homogeneous mode throttle opening TA1. In this manner, the torque is adjusted according to a common control value (the torque reflecting value), which is the throttle opening TA1, in both combustion modes, which prevents the engine torque from abruptly changing when the combustion mode is switched.

(2) In homogeneous stoichiometric combustion with EGR, a decrease of the torque due to EGR is compensated for by adding the opening adjustment value TAo to the target homogeneous mode throttle opening TA1. In homogeneous stoichiometric combustion with EGR, the torque is adjusted by referring to the target homogeneous mode throttle opening TA1. The engine torque is adjusted based on a common control value, which is the throttle opening TA1, both in homogeneous stoichiometric combustion with EGR and in stratified lean combustion. Therefore, under a constant running state of the engine, the engine torque does not vary between homogeneous stoichiometric combustion with EGR and stratified lean combustion. Thus, when the combustion mode is switched from homogeneous stoichiometric combustion with EGR to stratified lean combustion, the engine torque is not suddenly changed. therefore, the drivability is not degraded.

It should be apparent to those skilled in the art that the present invention may be embodied in many other specific forms without departing from the spirit or scope of the invention. Particularly, it should be understood that the invention may be embodied in the following forms.

In the illustrated embodiment, the target homogeneous mode throttle opening TA1, which is suitable for homogeneous stoichiometric combustion without EGR, is always computed as the hypothetical throttle opening TA1 regardless of the combustion mode and regardless of whether the EGR is being performed. However, the torque may be adjusted based, for example, on the target EGR throttle opening TA2.

In this case, the target EGR throttle opening TA2 is computed based on the acceleration pedal depression degree ACCP and other values by referring to a map. Specifically, the target EGR throttle opening TA2 is computed as a throttle opening on the supposition that homogeneous stoichiometric combustion with EGR is performed at the current acceleration depression degree ACCP. The computed target EGR throttle opening TA2 corresponds to the intake air amount during homogeneous stoichiometric combustion with EGR.

During stratified lean combustion, the target EGR throttle opening TA2 is used as the hypothetical throttle opening TA2. Based on the target EGR throttle opening TA2 and other values, a hypothetical load ratio (hypothetical intake air amount) is computed. The fuel injection amount is controlled based on the hypothetical load ratio to adjust the torque of the engine 11. During homogeneous stoichiometric combustion with EGR, the torque of the engine 11 is adjusted by controlling the throttle opening based on the target EGR throttle opening TA2. Thus, both in homogeneous stoichiometric combustion with EGR and in stratified lean combustion, the torque is adjusted based on a common control value, which is the target EGR throttle opening TA2. Therefore, like the embodiment of FIGS. 1 to 8(g), the torque is not abruptly changed when the combustion mode is switched under the same running conditions. Therefore, the torque is prevented from being suddenly changed.

During homogeneous stoichiometric combustion without EGR, the amount of new air drawn into the combustion chamber 16 is increased by the EGR amount, which may abruptly increase the engine torque. Therefore, the ECU 92 computes the target homogeneous mode throttle opening TA1, which is suitable for homogeneous stoichiometric combustion without ERG, by subtracting a closing adjustment value TAc from the target EGR throttle opening TA2. Then, the ECU 92 controls the throttle opening based on the target homogeneous mode throttle opening TA1 to adjust the engine torque during homogeneous stoichiometric combustion without EGR. The closing adjustment value TAc is computed based, for example, on the target EGR throttle opening TA2 and the engine speed NE.

Therefore, both in stoichiometric combustion without EGR and in homogeneous stoichiometric combustion with EGR, the engine torque is adjusted based on a common control value, which is the target EGR throttle opening TA2. Accordingly, when the running state of the engine 11 is constant, the torque is not abruptly changed if the combustion mode is switched between homogeneous stoichiometric combustion without EGR and homogeneous stoichiometric combustion with EGR.

Therefore, the present examples and embodiments are to be considered as illustrative and not restrictive and the invention is not to be limited to the details given herein, but may be modified within the scope and equivalence of the appended claims.

What is claimed is:

1. A controlling apparatus of an engine that generates torque by combusting air fuel mixture in a combustion chamber, wherein the engine operates in a combustion mode selected from a homogeneous stoichiometric combustion mode and a stratified lean combustion mode, the homogeneous stoichiometric combustion mode including a first homogeneous mode and a second homogeneous mode, wherein, when the engine operates in one of the first and second homogeneous modes, EGR control, in which some of exhaust gas is recirculated to the combustion chamber, is performed, and wherein, when the engine operates in the other of the first and second homogeneous modes, EGR control is not performed, the apparatus comprising:

computing means, wherein the computing means computes a torque reflecting value based on the running state of the engine, the torque reflecting value reflecting an engine torque demanded when the engine operates in the first homogeneous mode;

intake air control means, wherein, when the engine operates in the homogeneous stoichiometric combustion mode, the intake air control means controls the amount of intake air drawn into the combustion chamber thereby adjusting the engine torque, wherein, when the engine operates in the first homogeneous mode, the intake air control means controls the intake air amount based on the torque reflecting value, and wherein, when the engine operates in the second homogeneous mode, the intake air control means modifies the torque reflecting value for compensating for the difference of the engine torque between the first and second homogeneous modes due to whether EGR control is performed, and wherein the intake air control means controls the intake air amount based on the modified torque reflecting value; and fuel control means, wherein, when the engine operates in the stratified lean combustion mode, the fuel control means controls the amount of fuel supplied to the combustion chamber based on the torque reflecting value thereby adjusting the engine torque.

2. The apparatus according to claim 1, wherein the engine includes a throttle valve and an injector, wherein the intake air control means controls the throttle valve thereby adjusting the amount of intake air drawn into the combustion chamber, wherein the fuel control means controls the injector thereby injecting fuel into the combustion chamber.

3. The apparatus according to claim 2, wherein the computing means computes a target opening of the throttle valve that is suitable for the first homogeneous mode as the torque reflecting value.

4. The apparatus according to claim 1, wherein, when the engine operates in the stratified lean combustion mode, the computing means computes a hypothetical parameter based on the torque reflecting value, wherein the hypothetical parameter correlates with the amount of intake air drawn into the combustion chamber on the supposition that the engine operates in the first homogeneous mode in the current running state, and wherein the fuel control means controls the amount of fuel supplied to the combustion chamber based on the hypothetical parameter.

5. The apparatus according to claim 4, wherein the engine includes a throttle valve, wherein the intake air control means controls the throttle valve thereby adjusting the amount of intake air drawn into the combustion chamber, wherein the computing means computes a target opening of the throttle valve that is suitable for the first homogeneous mode as the torque reflecting value, wherein, when the engine operates in the stratified lean combustion mode, the computing means computes a target opening on the supposition that the engine operates in the first homogeneous mode in the current running state and sets the computed target opening as a hypothetical throttle opening, and wherein the computing means computes the hypothetical parameter based on the hypothetical throttle opening.

6. The apparatus according to claim 4, wherein the parameter includes the pressure of intake air drawn in to the combustion chamber.

7. The apparatus according to claim 1, wherein, when the engine operates in the first homogeneous mode, EGR control is performed, and wherein, when the engine operates in the second homogeneous mode, EGR control is not performed.

8. A controlling apparatus of an engine that generates torque by combusting air fuel mixture in a combustion chamber, wherein the engine operates in a combustion mode selected from a homogeneous stoichiometric combustion mode and a stratified lean combustion mode, the homogeneous stoichiometric combustion mode including a first homogeneous mode and a second homogeneous mode, wherein, when the engine operates in one of the first and second homogeneous modes, EGR control, in which some of exhaust gas is recirculated to the combustion chamber, is performed, and wherein, when the engine operates in the other of the first and second homogeneous modes, EGR control is not performed, the apparatus comprising:

a controller, wherein the controller computes a torque reflecting value based on the running state of the engine, the torque reflecting value reflecting an engine torque demanded when the engine operates in the first homogeneous mode;

wherein, when the engine operates in the first homogeneous mode, the controller controls the amount of intake air drawn into the combustion chamber based on the torque reflecting value thereby adjusting the engine torque;

wherein, when the engine operates in the second homogeneous mode, the controller modifies the torque reflecting value for compensating for the difference of the engine torque between the first and second homogeneous modes due to whether EGR control is performed, and wherein the controller controls the intake air amount based on the modified torque reflecting value; and wherein, when the engine operates in the stratified lean combustion mode, the controller controls the amount of fuel supplied to the combustion chamber based on the torque reflecting value thereby adjusting the engine torque.

9. A method for controlling an engine that generates torque by combusting air fuel mixture in a combustion chamber, wherein the engine operates in a combustion mode selected from a homogeneous stoichiometric combustion mode and a stratified lean combustion mode, the homogeneous stoichiometric combustion mode including a first homogeneous mode and a second homogeneous mode, wherein, when the engine operates in one of the first and second homogeneous modes, EGR control, in which some of exhaust gas is recirculated to the combustion chamber, is performed, and wherein, when the engine operates in the other of the first and second homogeneous modes, EGR control is not performed, the method comprising:

computing a torque reflecting value based on the running state of the engine, the torque reflecting value reflecting an engine torque demanded when the engine operates in the first homogeneous mode;

controlling the amount of intake air drawn into the combustion chamber based on the torque reflecting value thereby adjusting the engine torque when the engine operates in the homogeneous stoichiometric combustion mode;

modifying the torque reflecting value when the engine operates in the second homogeneous mode thereby compensating for the difference of the engine torque between the first and second homogeneous modes due to whether EGR control is performed, wherein, when the engine operates in the second homogeneous mode, the intake air amount is controlled based on the modified torque reflecting value; and controlling the amount of fuel supplied to the combustion chamber based on the torque reflecting value when the engine operates in the stratified lean combustion mode thereby adjusting the engine torque.

10. The method according to claim 9, wherein the amount of intake air drawn into the combustion chamber is adjusted by a throttle valve, and wherein the torque reflecting value is a target opening of the throttle valve that is suitable for the first homogeneous mode.

11. The method according to claim 9, further comprising, computing a hypothetical parameter based on the torque reflecting value when the engine operates in the stratified lean combustion mode, wherein the hypothetical parameter correlates with the amount of intake air drawn into the combustion chamber on the supposition that the engine operates in the first homogeneous mode in the current running state, and wherein controlling the amount of fuel supplied to the combustion chamber based on the torque reflecting value includes controlling the amount of fuel supplied to the combustion chamber based on the hypothetical parameter.

12. The method according to claim 11, wherein the amount of intake air drawn into the combustion chamber is adjusted by a throttle valve, and wherein the torque reflecting value is a target opening of the throttle valve that is suitable for the first homogeneous mode.

13. The method according to claim 11, wherein the parameter includes the pressure of intake air drawn in to the combustion chamber.

14. The method according to claim 9, wherein, when the engine operates in the first homogeneous mode, EGR control is performed, and wherein, when the engine operates in the second homogeneous mode, EGR control is not performed.

* * * * *